United States Patent
Seifer

(10) Patent No.: US 8,845,492 B2
(45) Date of Patent: Sep. 30, 2014

(54) ENGINE CONTROL OVERRIDE SYSTEMS AND METHODS

(75) Inventor: Ethan Charles Seifer, Hope, IN (US)

(73) Assignee: Cummins Inc., Columbus, IN (US)

( * ) Notice: Subject to any disclaimer, the term of this patent is extended or adjusted under 35 U.S.C. 154(b) by 206 days.

(21) Appl. No.: 13/484,102

(22) Filed: May 30, 2012

(65) Prior Publication Data

US 2013/0324365 A1    Dec. 5, 2013

(51) Int. Cl.
*B60W 10/06* (2006.01)
*B60W 10/18* (2012.01)

(52) U.S. Cl.
USPC ........................................................ 477/186

(58) Field of Classification Search
CPC . B60W 10/06; B60W 10/18; B60W 2540/10; B60W 2540/12
USPC .................................. 477/186, 187, 200, 205
See application file for complete search history.

(56) References Cited

U.S. PATENT DOCUMENTS

| | | | |
|---|---|---|---|
| 4,120,373 A | 10/1978 | Fleischer | |
| 4,462,479 A | 7/1984 | Steel | |
| 4,515,125 A | 5/1985 | Buck et al. | |
| 4,612,615 A | 9/1986 | Murakami | |
| 4,946,012 A | 8/1990 | Foster | |
| 5,121,723 A | 6/1992 | Stepper et al. | |
| 5,125,485 A | 6/1992 | Lang | |
| 5,150,681 A | 9/1992 | Kull et al. | |
| 5,193,640 A | 3/1993 | Lee | |
| 5,731,977 A | 3/1998 | Taniguchi et al. | |
| 5,916,062 A | 6/1999 | Siepker | |
| 6,361,471 B1 | 3/2002 | Heed | |
| 7,134,985 B2 * | 11/2006 | Watanabe et al. | 477/186 |
| 7,226,389 B2 | 6/2007 | Steen et al. | |
| 7,344,478 B2 | 3/2008 | Reith | |
| 7,410,447 B2 * | 8/2008 | Jamzadeh | 477/186 |
| 7,556,587 B2 | 7/2009 | Jiang et al. | |
| 7,762,926 B2 | 7/2010 | Peterson | |
| 7,904,246 B2 | 3/2011 | Kondoh et al. | |
| 8,145,409 B2 | 3/2012 | Kerns et al. | |
| 2007/0034440 A1 | 2/2007 | Zomotor | |
| 2011/0295479 A1 | 12/2011 | Nodera et al. | |

FOREIGN PATENT DOCUMENTS

| | | |
|---|---|---|
| EP | 0507466 B1 | 7/1992 |
| EP | 0983894 B1 | 3/2000 |
| EP | 1486656 A2 | 12/2004 |
| EP | 1526051 B1 | 4/2005 |
| GB | 2392512 B | 11/2004 |

OTHER PUBLICATIONS

International Search Report and Written Opinion, PCT/US2013/043078, ISA/US, Cummins Inc., 24 Oct. 23, 2013.
H.R. 5381, 111th Congress, 2d Session (2010).

* cited by examiner

*Primary Examiner* — Edwin A Young
(74) *Attorney, Agent, or Firm* — Krieg DeVault LLP

(57) ABSTRACT

A system comprising a controller configured to determine if a brake control of a vehicle is actuated; determine a delay time in response to a speed of the vehicle; determine if the delay time has passed from when the brake control was actuated; and if the delay time has passed, override an engine control of the vehicle.

24 Claims, 7 Drawing Sheets

ENGINE CONTROL OVERRIDE SYSTEMS AND METHODS

BACKGROUND

The technical field generally relates to engine control systems and, in particular, to engine control override systems.

Vehicle controls, such as accelerator, brake, and steering control are transitioning to electronic systems. Positions of such controls are communicated by electronic signals rather than by mechanical linkages. Hazardous situations can arise when such electronic systems and even mechanical linkages malfunction.

Therefore, further technological developments are desirable in this area.

SUMMARY

One embodiment is a unique system comprising a controller configured to determine if a brake control of a vehicle is actuated; determine a delay time in response to a speed of the vehicle; determine if the delay time has passed from when the brake control was actuated; and if the delay time has passed, override an engine control of the vehicle.

Other embodiments include unique methods and systems to override engine controls. Further embodiments, forms, objects, features, advantages, aspects, and benefits shall become apparent from the following description and drawings.

DESCRIPTION OF THE ILLUSTRATIVE EMBODIMENTS

Figure 1:
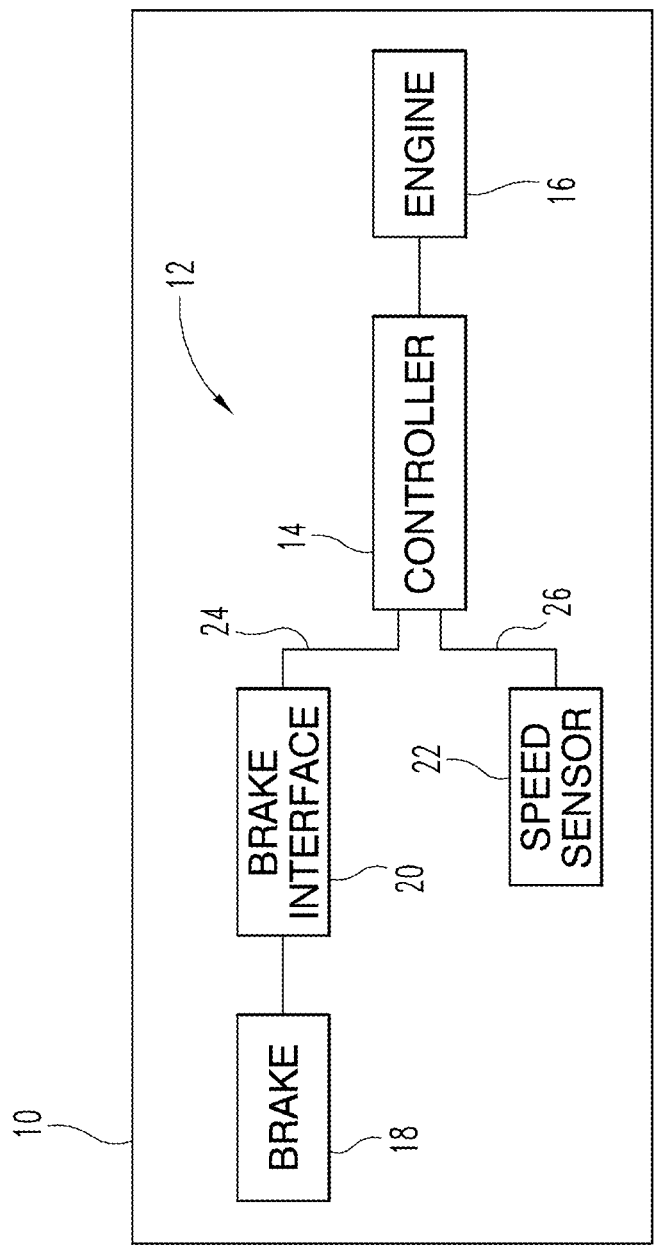
FIG. 1 is a block diagram of a vehicle with an engine control override system according to an embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a block diagram of a vehicle with an engine control override system according to an embodiment. In this embodiment, a vehicle 10 can include an engine control system 12. The vehicle 10 can be any variety of vehicle that can contain an engine 16.

The engine control system 12 can include a controller 14 coupled to an engine 16. In an embodiment, the controller 14 can be a stand alone system. Alternatively, the controller 14 can be part of a larger engine management system, emissions control system, or the like. Furthermore, the functionality of the controller 14 can be spread across multiple devices, processors, sub-systems, or the like. The controller 14 can be any variety of controller. For example, the controller 14 can include a general purpose processor, a microcontroller, an application specific integrated circuit, a programmable logic device, a combination of such devices, or the like.

The engine 16 can be any variety of engine. In an embodiment, the engine 16 can be a combustion engine. However, the engine 16 can also represent a hybrid engine system with a combustion engine and electric motor, a pure electric motor system, or the like.

The vehicle includes a brake control 18. The brake control 18 can include a variety of devices. For example, the brake control 18 can include a brake pedal, a hand operated brake, or the like. In an embodiment, the brake control 18 can be a service brake of the vehicle 10. In particular, the brake control 18 can be a primary control for a driver of the vehicle for decreasing speed and/or stopping the vehicle 10. For example, when the vehicle 10 is unintentionally accelerating, the brake control 18 can be the first user operated control a driver would apply to attempt to slow the vehicle 10.

The brake control 18 is coupled to a brake interface 20. The brake interface 20 represents a connection between the brake control 18 and controller 14. The brake interface 20 is configured to transform an actuation of the brake control 18 to a format suitable for the controller 20. For example, the brake interface 20 can include one or more sensors, such as switches, analog position sensors, or the like, that are coupled to the brake control 18. In response to these devices, the brake interface 20 can be configured to send a brake signal 24 to the controller 14. The brake signal 24 can be a raw output such as a voltage from a potentiometer, a processed output such as a packetized signal indicating a state of the brake control 18, an intermediate output, or the like. In an embodiment, the brake interface 20 can provide redundant signals. Accordingly, the brake signal 24 can include multiple individual brake signals.

Regardless of the form, the brake signal 24 can be used by the controller to determine a state of the brake control 18. In particular, the controller 14 can be configured to determine if the brake control 18 of the vehicle 10 is actuated. In an embodiment, an actuation of the brake control 18 can be any actuation. For example, the brake interface 20 can include a switch that is actuated whenever the brake control 18 is actuated. In another example, the brake signal 24 can be a variable magnitude that, when interpreted by the controller 14 as being greater than or equal to a threshold, is interpreted as being actuated.

Furthermore, a standard used by the controller 14 to determine if the brake control 18 is actuated can be different from other uses of the brake control 18 state by the controller 14. That is, even though the controller 14 may not consider the brake control 18 actuated for purposes of overriding an engine control, the controller 14 or other systems can still respond to the brake control 18.

The controller 14 can also be coupled to a vehicle speed sensor 22. For example, the speed sensor 22 can be coupled to a wheel, a transmission, axle, or other similar structure of the vehicle 10. The speed sensor 22 can be configured to generate a speed signal 26 in response to a speed of the vehicle 10.

The controller 14 can be configured to determine a delay time in response to a speed of the vehicle. For example, the controller 14 can be configured to receive the speed signal 26, then access a lookup table, apply a function, or the like to convert the vehicle speed into a delay time.

The controller 14 can be configured to determine if the delay time has passed from when the brake control 18 was actuated. If the delay time has passed, the controller 14 can be configured to override an engine control of the vehicle.

Figure 2:
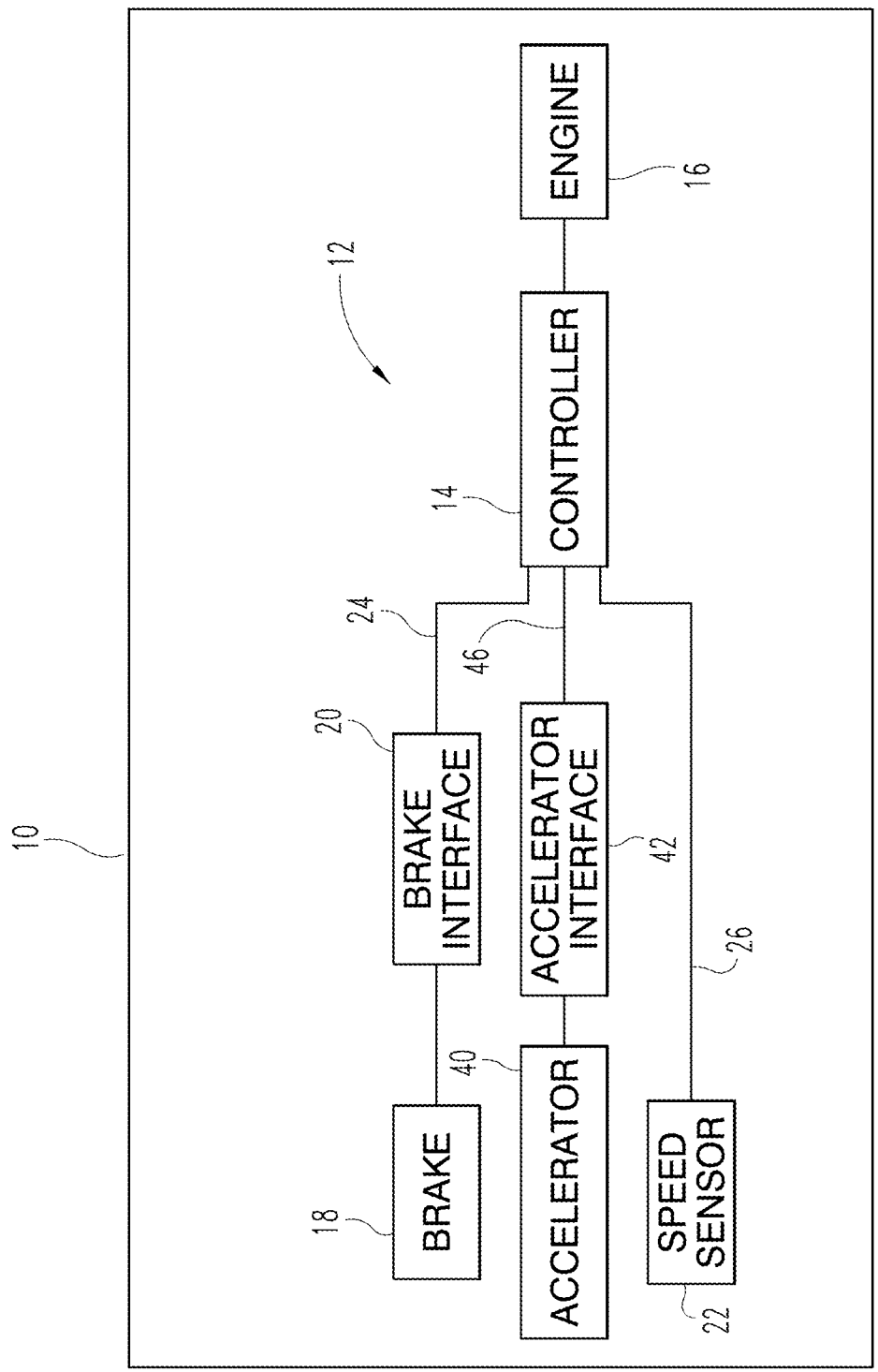
FIG. 2 is a block diagram of a vehicle with an engine control override system according to another embodiment.

FIG. 2 is a block diagram of a vehicle with an engine control override system according to another embodiment. In this embodiment, the vehicle 10 includes an accelerator 40. The accelerator 40 is coupled to an accelerator interface 42. Similar to the brake interface 20, the accelerator interface 42 can be configured to transform a position of the accelerator 40 into an accelerator control signal 46. The controller 14 is coupled to the accelerator interface 42 and configured to receive the accelerator control signal 46.

The accelerator control signal 46 can be used by the controller 14 as an engine control to control the engine 16. In an embodiment, the accelerator 40 can become stuck, the accelerator interface 42 can fail, or the like. Accordingly, the accelerator control signal 46 can represent an erroneous state of the accelerator. The error can result in unintended acceleration, or other hazardous conditions.

The accelerator control signal 46 can be overridden by the controller 14. For example, the accelerator control signal 46 can be set to a minimum. The minimum can be a level that the accelerator control signal 46 would be set to if the accelerator 40 and accelerator interface 42 were operating properly and not actuated. The override can occur a delay time after the brake control 18 has been actuated. For example, in a situation when the accelerator 40 has become stuck, a driver can apply the brake control 18. Once the brake control 18 has been applied for at least the delay time, the controller 14 can override the accelerator 40 and alleviate any unintended acceleration.

Although the accelerator control signal 46 has been described as the signal transmitted by the accelerator interface 42, the accelerator control signal 46 can exist in other forms and be overridden in those forms to override the accelerator control signal 46. For example, within the controller 14, the accelerator control signal 42 can be processed into a normalized signal. The normalized signal can be limited, set to a minimum, or otherwise changed to override the accelerator control signal 46.

Figure 3:
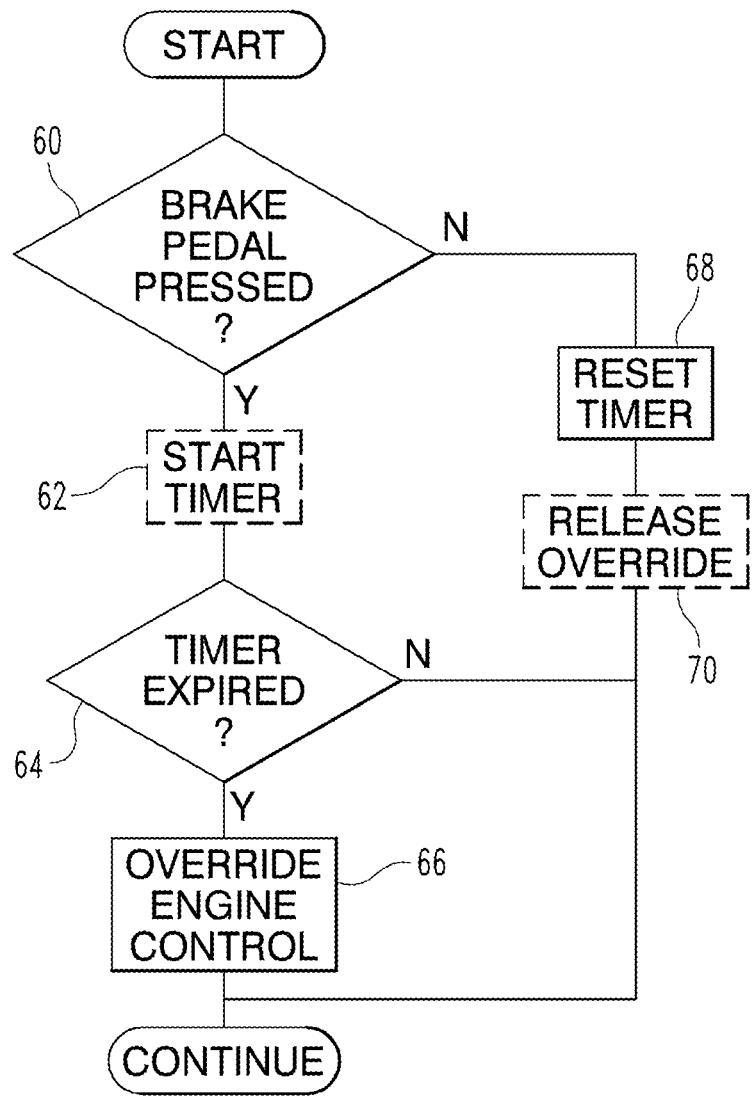
FIG. 3 is a flowchart illustrating a technique of overriding an engine control according to an embodiment.

FIG. 3 is a flowchart illustrating a technique of overriding an engine control according to an embodiment. In this embodiment, a determination is made whether a brake pedal is pressed in 60. If the brake pedal is pressed, a timer can be started in 62. The start of the timer in 62 is illustrated in phantom as the timer is not restarted if the operation is repeated. That is, if the brake pedal is continuously pressed, the timer in 62 is started only once.

In 64 the timer is checked to determine if the time has expired. If not, the operation continues. Control can return to this operation at a later time for further checks to determine if the brake pedal is applied in 60 and if the timer has expired in 64.

If the timer has expired, then the delay time represented by the timer has elapsed. Accordingly, an engine control is overridden in 66. If the brake remains actuated, the override of the engine control can be maintained by the override in 66.

Returning to 60 if the brake pedal is not pressed. The timer is reset in 68. For example, the timer can begin in 62 when the brakes are initially applied. However, in normal usage, the brake pedal can be released before the delay time has passed. Accordingly, the timer is reset in 68. Thus, the engine control is not overridden in 66 until the brake has been continuously actuated. In addition, if the engine control has been overridden in 66, by resetting the timer in 68, subsequent overriding of the engine control in 66 can be delayed until another delay time passes after the brake is again actuated.

In 70, the override of an engine control can be released 70. The release in 70 is illustrated in phantom as the override may not have occurred and need not be released. In another embodiment, the override can be a non-latching override. That is, if the override is not refreshed, reapplied, or the like, the override can be automatically released.

The timer and determining if the timer expired are one example of how a delay time can be tracked. However, time can be tracked in other ways. For example, a current time can be compared against an initial time when the brake pedal was pressed. If the difference is greater than or equal to the delay time, the engine control can be overridden. In another example, a controller can be configured to receive an interrupt after the delay time has passed. The interrupt handler can determine if the brake pedal was continuously actuated and, if so, the engine control can be overridden.

Figure 4:
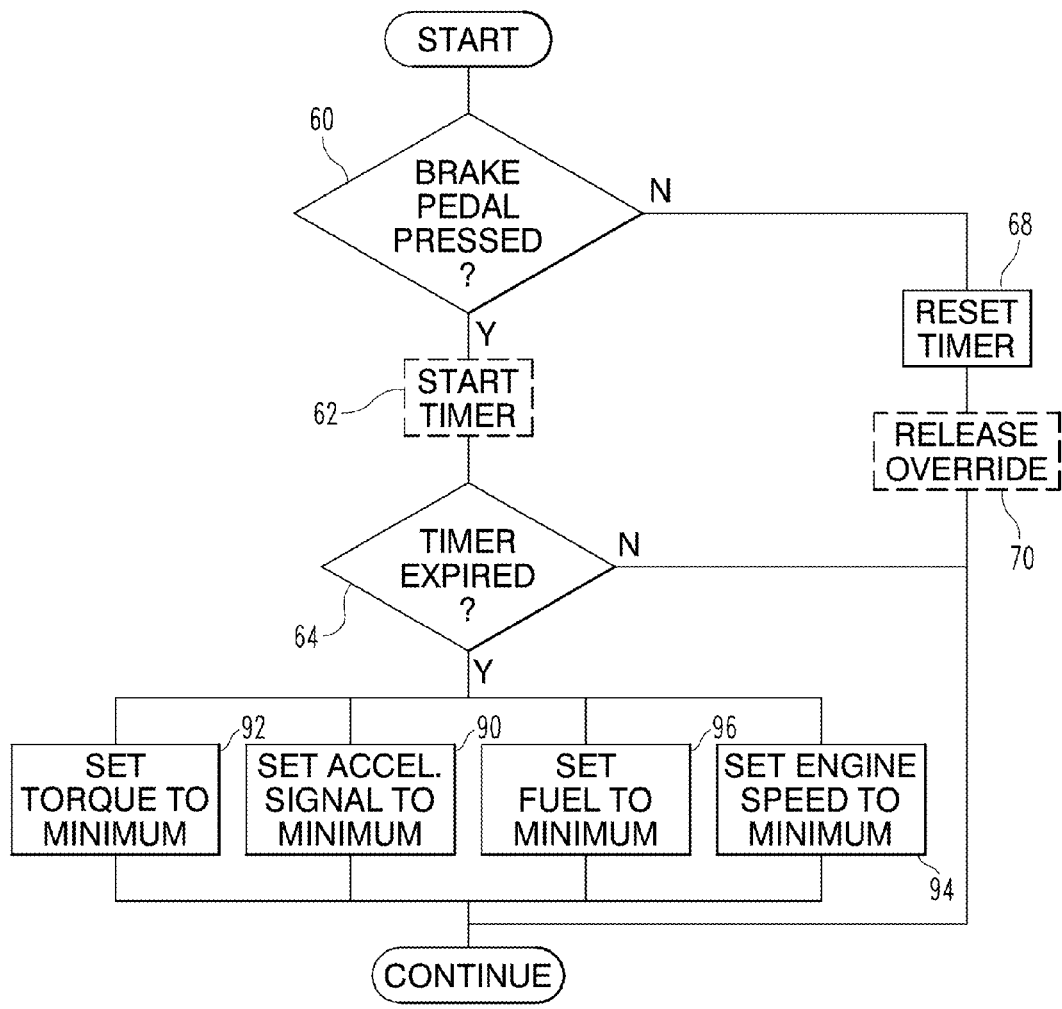
FIG. 4 is a flowchart illustrating a variety of techniques of overriding an engine control according to some embodiments.

FIG. 4 is a flowchart illustrating a variety of techniques of overriding an engine control according to some embodiments. In an embodiment one or more of a variety of engine controls can be included in the overriding in 66 described above. For example, the accelerator signal can be set to a minimum in 90.

In another example, a torque signal can be set to a minimum in 92. A desired torque from the engine can be set to a minimum, such as a sufficient amount to overcome engine losses, accessories, or the like. Thus, when the control is overridden, the engine can remain operating.

In 94, an engine speed can be set to a minimum. For example, the engine speed can be set to an idle speed. Again, the override can maintain the operation of the engine, but limit potentially hazardous conditions with the override.

In 96, the fuel to the engine can be set to a minimum. For example, an actual amount of fuel delivered to the engine can be limited to an amount sufficient to operate the engine in an idle condition. Any of the above engine controls or other engine controls can be overridden singularly or in combination. For example, in addition to overriding an accelerator signal, a fuel signal can also be overridden.

Figure 5:
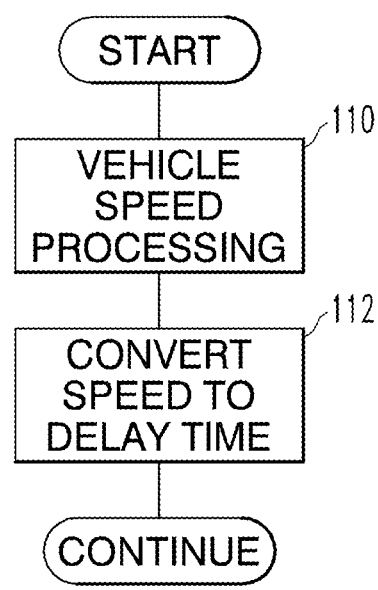
FIG. 5 is a flowchart illustrating a conversion of vehicle speed to delay time according to an embodiment.

FIG. 5 is a flowchart illustrating a conversion of vehicle speed to delay time according to an embodiment. In an embodiment, the vehicle speed can be converted to a delay time. For example, an operation can include vehicle speed processing in 110. The vehicle speed processing in 110 can include any processing, normalization, or other speed related functions. In 112 the vehicle speed can be converted to the delay time.

For example, a lookup table can convert a set of speeds to a set of delay times. A given speed can be used to interpolate, select a closest time, or otherwise generate a delay time from the delay times of the table. In another example the a mathematical function can convert the speed to a delay time.

Figure 6:
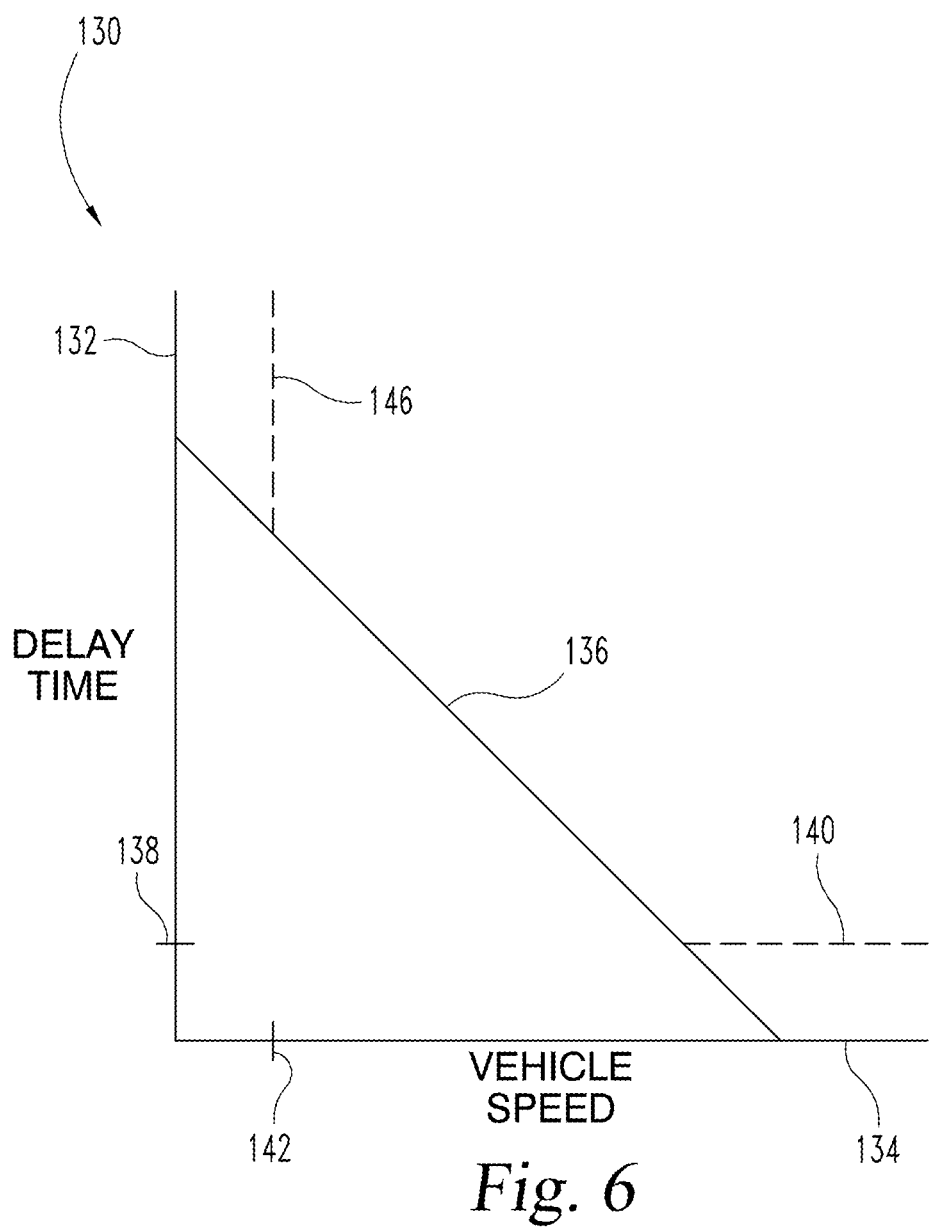
FIG. 6 is a chart illustrating a relationship of vehicle speed to delay time according to an embodiment.

FIG. 6 is a chart illustrating a relationship of vehicle speed to delay time according to an embodiment. In this embodiment, chart 130 includes a vehicle speed axis 134 and a delay time axis 132. Curve 136 represents a inverse linear relationship between vehicle speed and delay time.

In an embodiment, other non-linear effects can be applied to the conversion. For example, delay time 138 represents a minimum delay time. Thus, as the speed increases, the delay time can decrease; however, a minimum is applied resulting in curve 140.

Similarly, at speeds less than a speed 142, the delay time can be set at a large and/or substantially infinite value. Thus, at speeds below the speed 142, the delay time can represent an extended period of time and/or be effectively disabled. For example, when starting on a hill, attaching a trailer, or performing other precise maneuvers, a driver may apply both the accelerator and brake in a two-foot driving technique. In such circumstances, typically at a low speed, overriding an engine control can have an undesirable effect. Accordingly, the overriding can be effectively disabled.

Although linear relationships have been described, albeit with discontinuities, a relationship of vehicle speed to delay time can have a non-linear relationship. In an embodiment, the delay time can asymptotically approach the speed 138 as vehicle speed increases. In another embodiment, the delay time can monotonically decrease versus increasing vehicle speed.

Figure 7:
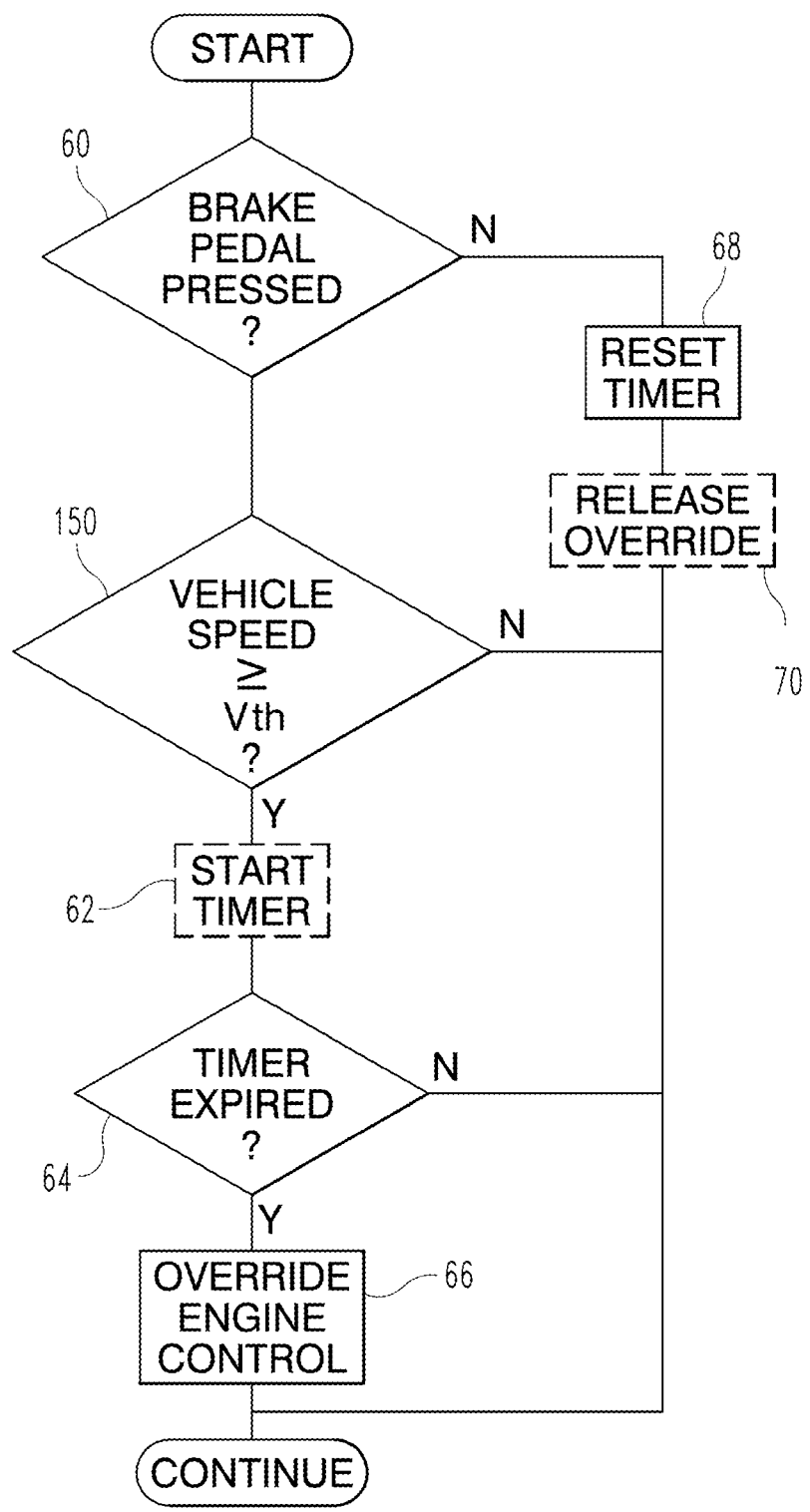
FIG. 7 is a flowchart illustrating a technique of overriding an engine control according to another embodiment.

FIG. 7 is a flowchart illustrating a technique of overriding an engine control according to another embodiment. This embodiment is similar to FIG. 3; however, in 150, a vehicle speed is compared with a threshold speed. If the speed is not greater than the threshold, the operation continues as if the brake was not pressed for the purposes of an override. However, if the speed exceeds the threshold in 150, the timer can be started in 62 and other processing described above can occur.

Although the flow from the comparison in 150 has been illustrated as continuing if the vehicle speed does not exceed the threshold, other functions can be performed as if the brake pedal was not pressed. For example, if the vehicle speed does not exceed the threshold, the timer can be reset in 68 and the override released in 70 as described above.

Although particular sequences of operations have been described above, in an embodiment, the sequence can occur as desired. For example, vehicle speed processing, vehicle speed threshold comparison, brake actuation, and the like can occur in any sequence.

An embodiment includes a computer-readable medium storing computer-readable code that when executed on a computer, causes the computer to perform the various techniques described above. Thus, in an embodiment, an update can be applied to a controller of a vehicle to override an engine control in response to the brake.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a controller configured to:
determine if a brake control of a vehicle is actuated;
determine a delay time in response to a speed of the vehicle, wherein the delay time is inversely related to the speed of the vehicle;
determine if the delay time has passed from when the brake control was actuated; and
if the delay time has passed, override an engine control of the vehicle.

2. The system of claim 1, wherein the controller is further configured to override the engine control if the speed of the vehicle exceeds a threshold.

3. The system of claim 1, wherein the engine control includes an accelerator signal generated in response to an accelerator of the vehicle.

4. The system of claim 3, wherein the controller is further configured to set the accelerator signal to a minimum if the delay time has passed.

5. The system of claim 1, wherein the engine control includes at least one of a fuel control, a torque control, and an engine speed control.

6. The system of claim 1, wherein the controller is further configured to maintain the override of the engine control while the brake control remains actuated.

7. The system of claim 1, wherein the controller is further configured to release the override of the engine control when the brake control is released.

8. A method, comprising:
determining if a brake control of a vehicle is actuated;
determining a delay time in response to a speed of the vehicle, wherein the delay time is inversely related to the speed of the vehicle;
determining if the delay time has passed from when the brake control was actuated; and
if the delay time has passed, overriding an engine control of the vehicle.

9. The method of claim 8, further comprising overriding the engine control if the speed of the vehicle exceeds a threshold.

10. The method of claim 8, wherein the engine control includes an accelerator signal generated in response to an accelerator of the vehicle.

11. The method of claim 8, wherein the engine control includes at least one of a fuel control, a torque control, and an engine speed control.

12. The method of claim 8, further comprising maintaining the override of the engine control while the brake control remains actuated.

13. The method of claim 8, further comprising releasing the override of the engine control when the brake control is released.

14. A computer-readable medium storing computer-readable code that when executed on a computer, causes the computer to:
determine if a brake control of a vehicle is actuated;
determine a delay time in response to a speed of the vehicle, wherein the delay time is inversely related to the speed of the vehicle;
determine if the delay time has passed from when the brake control was actuated; and
if the delay time has passed, override an engine control of the vehicle.

15. The computer readable medium of claim 14, further storing computer-readable code that when executed on the computer, causes the computer to override the engine control if the speed of the vehicle exceeds a threshold.

16. The computer readable medium of claim 14, wherein the engine control includes an accelerator signal generated in response to an accelerator of the vehicle.

17. The computer readable medium of claim 14, wherein the engine control includes at least one of a fuel control, a torque control, and an engine speed control.

18. The computer readable medium of claim 14, further storing computer-readable code that when executed on the computer, causes the computer to maintain the override of the engine control while the brake control remains actuated.

19. The computer readable medium of claim 14, further storing computer-readable code that when executed on the computer, causes the computer to release the override of the engine control when the brake control is released.

20. A vehicle, comprising:
an engine;
a vehicle speed sensor;
a brake control;
a controller configured to:
   determine if the brake control is actuated;
   determine a delay time in response to the vehicle speed sensor, wherein the delay time is inversely related to a speed of the vehicle;
   determine if the delay time has passed from when the brake control was actuated; and
   if the delay time has passed, override an engine control of the engine.

21. The vehicle of claim 20, further comprising:
an accelerator;
wherein the engine control includes an accelerator signal generated in response to the accelerator.

22. The vehicle of claim 20, wherein the engine control includes at least one of a fuel control, a torque control, and an engine speed control.

23. The vehicle of claim 20, wherein the controller is further configured to maintain the override of the engine control while the brake control remains actuated.

24. The vehicle of claim 20, wherein the controller is further configured to release the override of the engine control when the brake control is released.

* * * * *